(12) United States Patent
Gauthier et al.

(10) Patent No.: US 6,616,714 B1
(45) Date of Patent: Sep. 9, 2003

(54) PROCESS FOR CUTTING POLYMER ELECTROLYTE MULTI-LAYER BATTERIES AND BATTERIES OBTAINED THEREBY

(75) Inventors: Michel Gauthier, La Prairie (CA); Ginette Lessard, Longueuil (CA); Gaston Dussault, St-Benoît-de-Mirabel (CA); Roger Rouillard, Beloeil (CA); Martin Simoneau, Montréal (CA); Alan Paul Miller, Woodbury, MN (US)

(73) Assignees: Hydro-Quebec, Montreal (CA); Minnesota Mining and Manufacturing Company, St. Paul, MN (US)

( * ) Notice: Subject to any disclaimer, the term of this patent is extended or adjusted under 35 U.S.C. 154(b) by 0 days.

(21) Appl. No.: 09/393,493

(22) Filed: Sep. 10, 1999

Related U.S. Application Data

(63) Continuation-in-part of application No. 09/152,341, filed on Sep. 14, 1998, now abandoned.

(51) Int. Cl.[7] ............................................... H01M 6/00
(52) U.S. Cl. ..................... 29/623.1; 29/623.3
(58) Field of Search .................... 29/623.3, 623.1, 29/623.4, 730, 731, 623.5; 429/152, 94, 137, 139, 131, 142

(56) References Cited

U.S. PATENT DOCUMENTS

| | | | | |
|---|---|---|---|---|
| 5,100,746 A | * | 3/1992 | Muller et al. | 429/94 |
| 5,250,784 A | * | 10/1993 | Muller et al. | 219/121.72 |
| 5,354,631 A | * | 10/1994 | Chaloner-Gill et al. | 429/137 |
| 5,360,684 A | * | 11/1994 | Duval et al. | 429/162 |
| 5,378,557 A | * | 1/1995 | Murata et al. | 429/127 |
| 5,415,954 A | * | 5/1995 | Gauthier et al. | 429/94 |
| 5,478,363 A | * | 12/1995 | Klein | 29/623.1 |

* cited by examiner

Primary Examiner—Stephen Kalafut
Assistant Examiner—R Alejandro
(74) Attorney, Agent, or Firm—Katten Muchin Zavis Rosenman

(57) ABSTRACT

A stacking of battery laminate is prepared, each battery consisting of anode, polymer electrolyte, cathode films and possibly an insulating film, under conditions suitable to constitute a rigid monoblock assembly, in which the films are unitary with one another. The assembly obtained is thereafter cut in predetermined shape by using a mechanical device without macroscopic deformation of the films constituting the assembly and without inducing permanent short circuits. The battery which is obtained after cutting includes at least one end which appears as a uniform cut, the various films constituting the assembly having undergone no macroscopic deformation, the edges of the films of the anode including an electronically insulating passivation film.

15 Claims, 14 Drawing Sheets

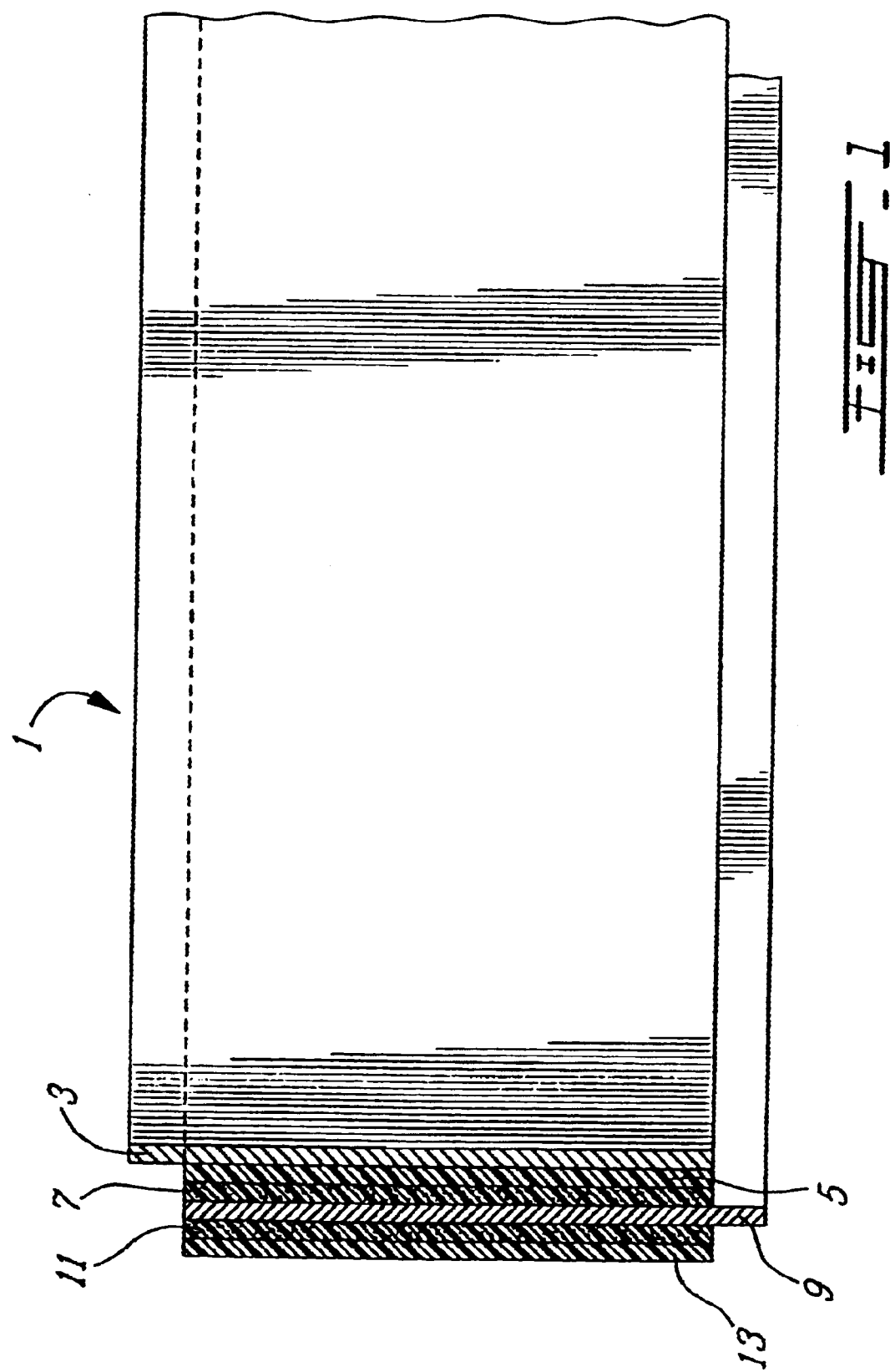

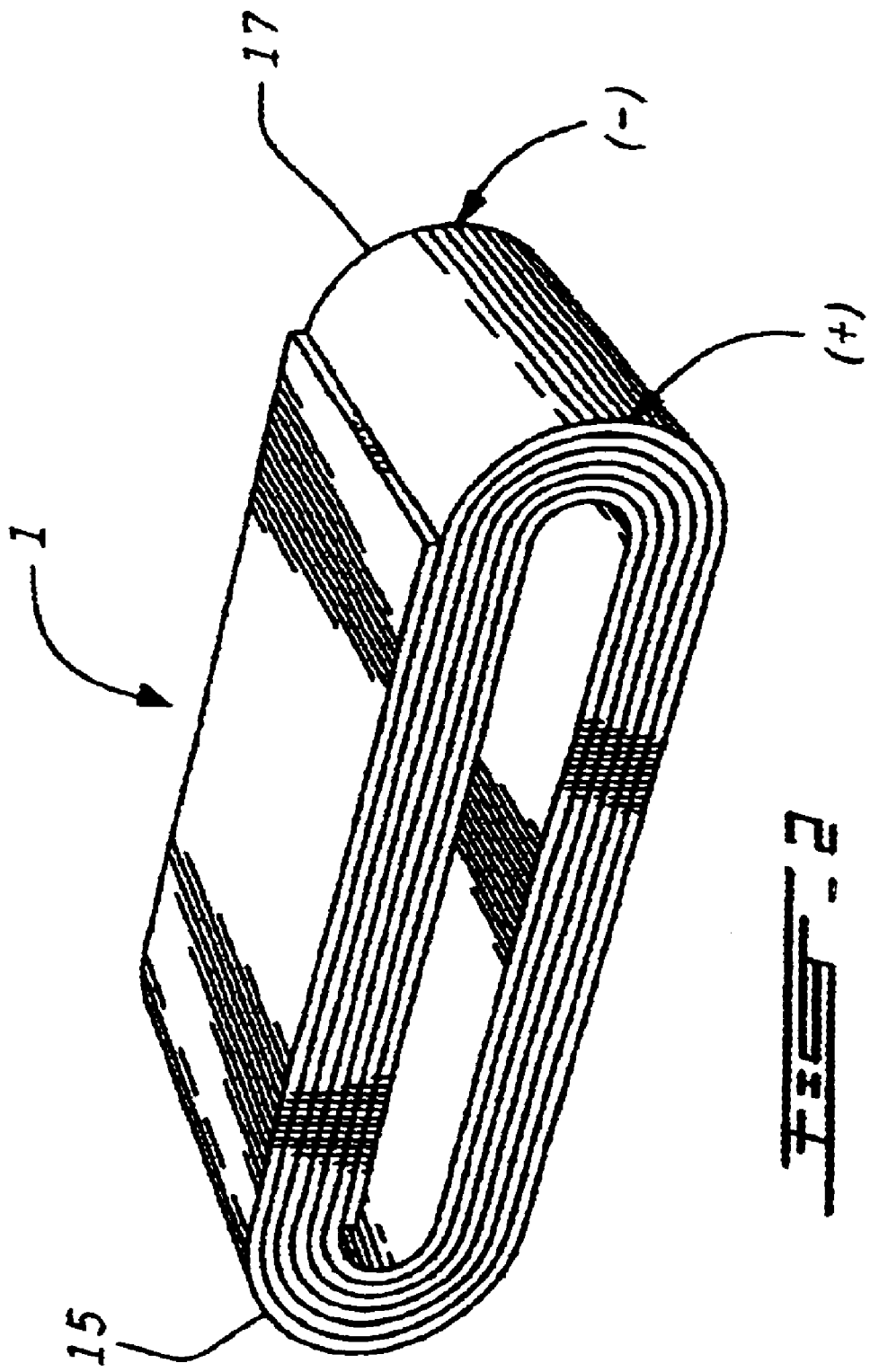

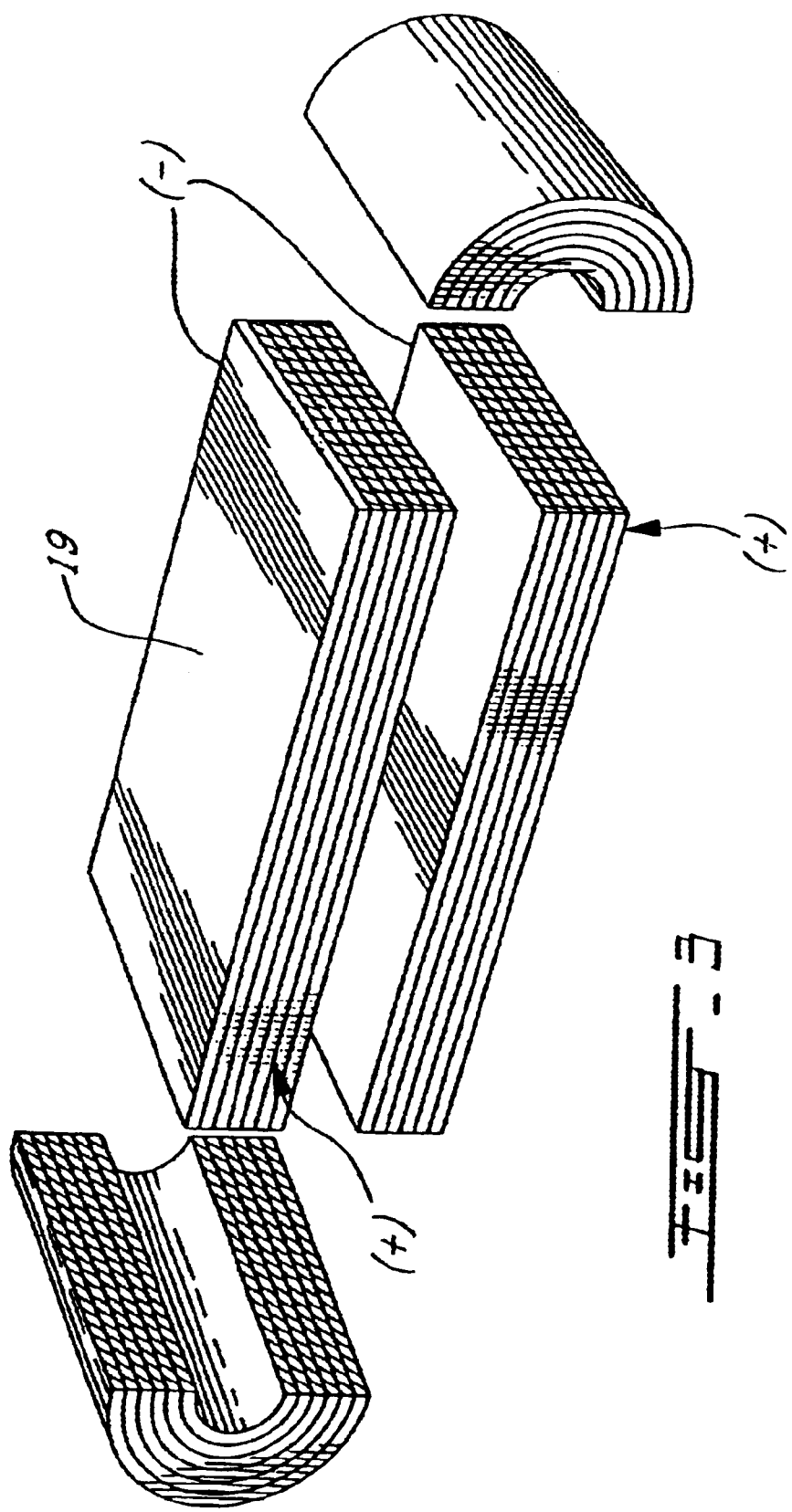

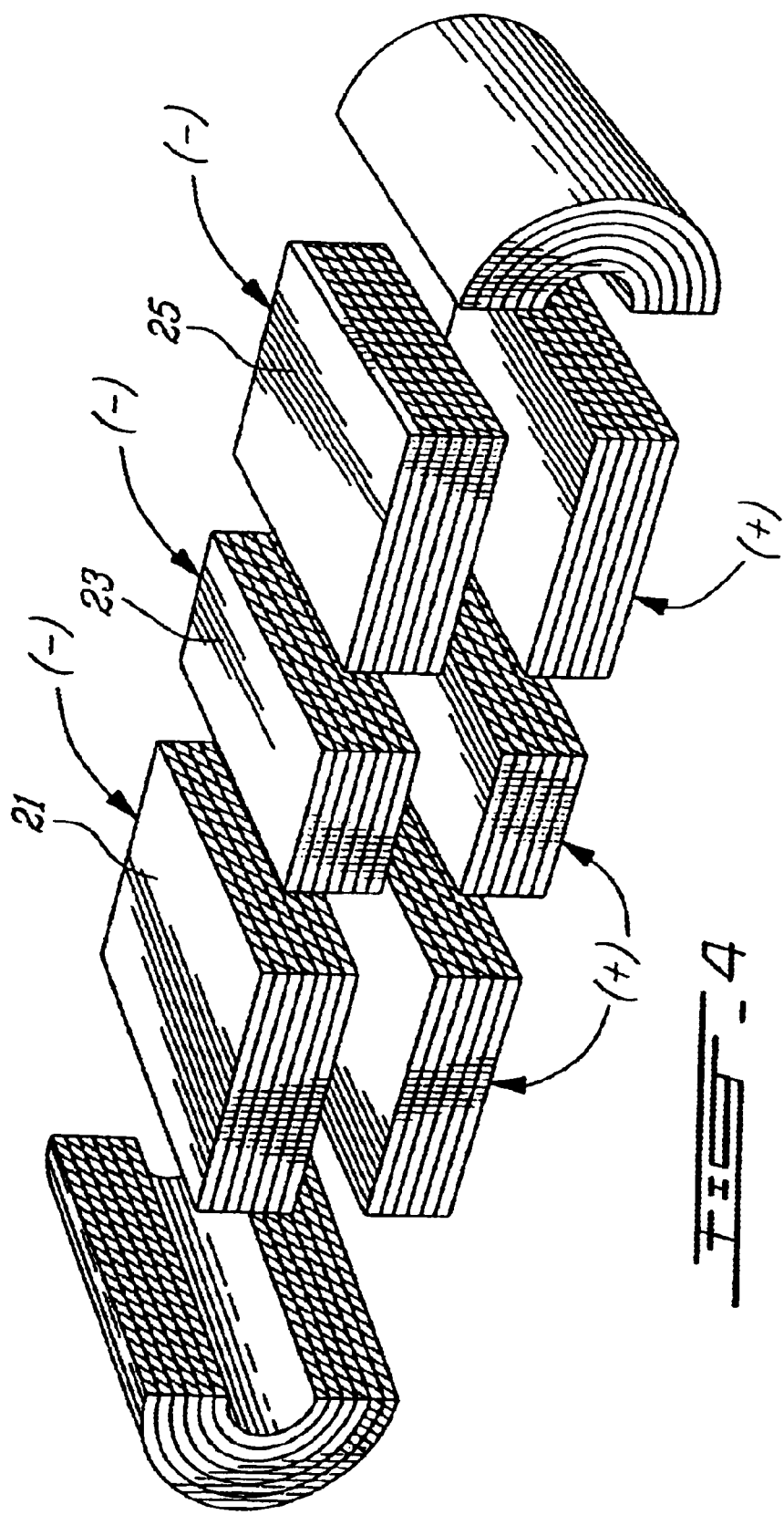

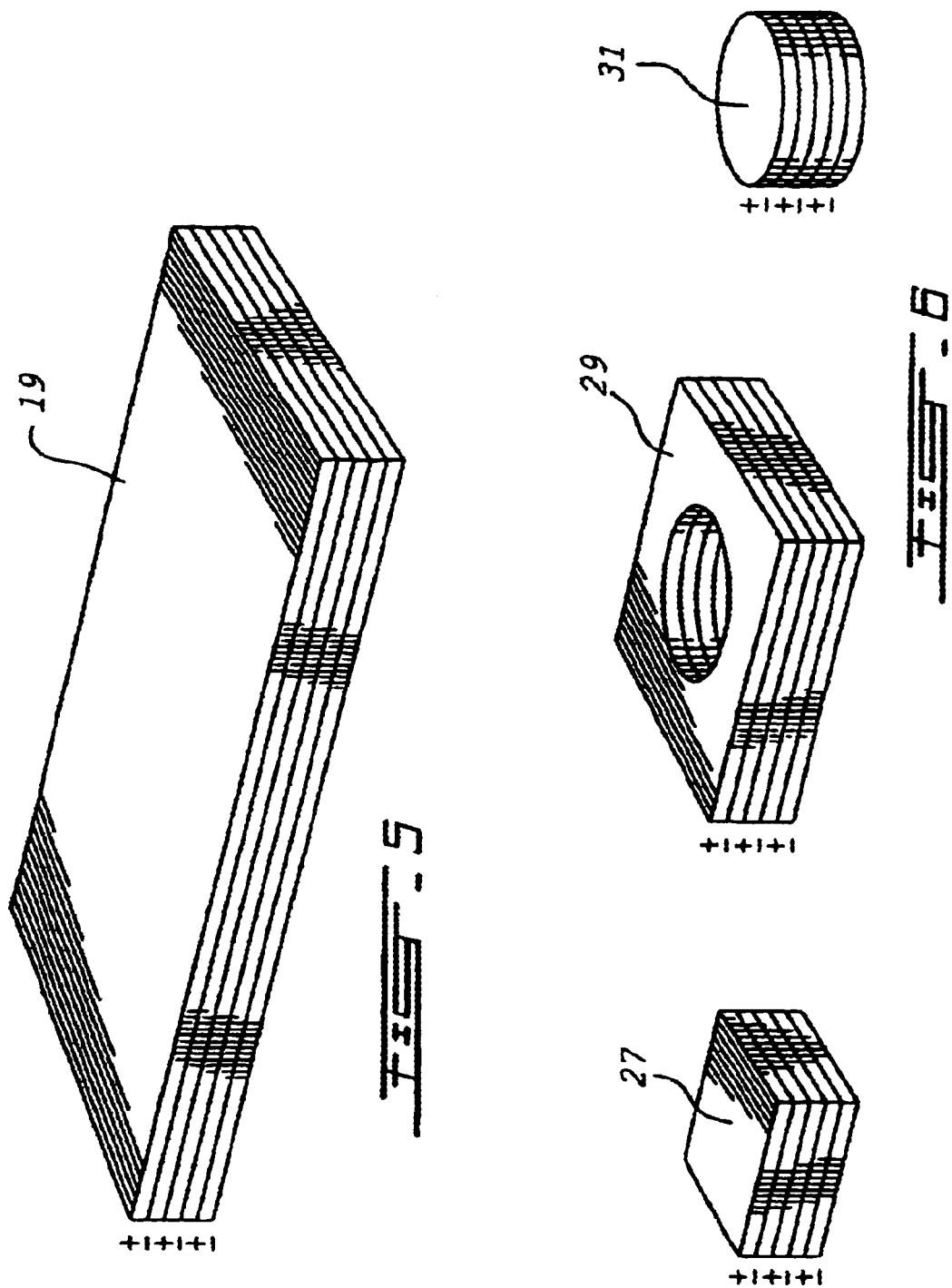

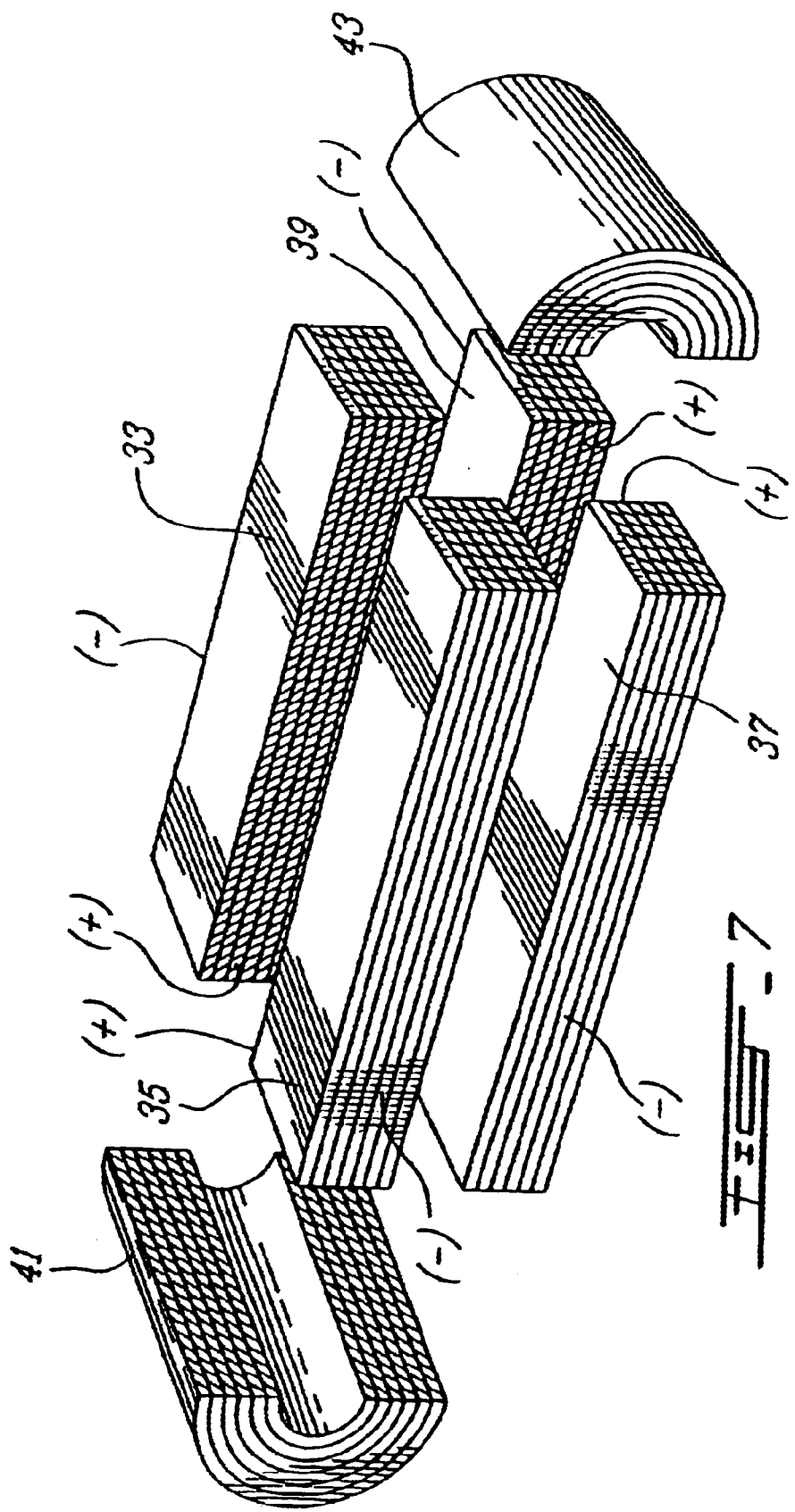

PROCESS FOR CUTTING POLYMER ELECTROLYTE MULTI-LAYER BATTERIES AND BATTERIES OBTAINED THEREBY

CROSS-REFERENCE

This application is a continuation-in-part of Ser. No. 09/152,341, filed Sep. 14, 1998 now abandoned.

GOVERNMENT LICENSE RIGHTS

The Government of the United States of America has rights in this invention pursuant to Cooperative Agreement No. DE-FCO2-91CE50336 awarded by the U.S. Department of Energy.

BACKGROUND OF INVENTION a) Field of the Invention

The present invention concerns a process of cutting out, with mechanical means, polymer electrolyte multi-layer electrochemical generators, in which the anode is preferably based on metallic lithium or compounds or alloys thereof. The invention is also concerned with certain designs of solid state multilayer layer batteries, produced according to the cutting process of the invention.

b) Description of the Prior Art

The manufacture of polymer electrolyte electrochemical generators or batteries in the form of thin films requires the production of multi-layer battery designs and involves the development of a surface which can reach the power and energy capacities required by the users. Generally, these generators are obtained by rolling or continuously or step-wise stacking important surfaces of juxtaposed films of anode, electrolyte, cathode, collector and, if necessary, electrically insulating materials. Reference will, for example, be made to U.S. Pat. No. 5,100,746 of Mar. 31, 1992.

On the other hand, it is known that thin laminated polymer electrolyte lithium batteries, which have been cut out with mechanical means, have the property of self-healing by local dissolution of lithium. However, when polymer electrolyte lithium batteries are in the form of multi-layer assemblies of thin laminated batteries, obtained either by rolling thin laminated batteries or by stacking thin laminated batteries in a parallel or bipolar arrangement, in which at least one rigid metallic collector is present in the thin laminated battery, it is difficult to achieve a mechanical cutting of such an assembly if the latter comprises more than one layer of thin laminated battery. Indeed, in the presence of a plurality of metallic layers such as lithium films and current collectors in the case of the films of the cathode, mechanical cutting produces local stresses and mechanical deformations due to local pressure which causes permanent short circuits in the battery.

It has been shown in U.S. Pat. No. 5,250,784 that it is possible to manufacture small individual batteries by cutting with laser. Moreover, in Canadian Patent Application Nos. 2,203,490 and 2,203,869 filed by the Applicant on Apr. 23 and 28, 1997 respectively, it has been shown that it is even possible to cut a single layer of laminated battery by a simple mechanical cutting operation. Cutting with laser, which vaporizes the materials without producing mechanical deformations, may itself generate residues which are sometimes conductive, for example, carbonized deposits which could cause short circuits. The technique of cutting with laser is therefore difficult to apply for parallel or bipolar multi-layer batteries. With respect to the mechanical cutting of one single layer, it is hard to apply to a multi-layer battery by reason of the cumulative mechanical deformations locally generated during the cutting operation, naturally resulting in the production of short circuits or weak points causing short circuits during consecutive cycles of charge/discharge.

An advantageous way of producing a multi-layer generator often consists in rolling or stacking the elements in parallel while allowing the respective collectors of the anode and the cathode to protrude on different lateral edges, so as to permit collection of the entire surface of the electrodes with lateral connections. Reference is made to U.S. Pat. No. 5,415,954 of May 16, 1995.

On the other hand, a battery design which is of particular interest, because it combines ease of manufacturing and volumic compactness is the one obtained by flat rolling, which is well known to those skilled in the art. The disadvantages associated with this design are, for example, the presence of curvature areas where, locally, the surfaces and current densities are uneven and where the pressure resulting from volume variations of the assembly cannot be compensated, which inevitably produces local stresses during consecutive cycles of charge/discharge. In a very general manner, the presence of these non-homogeneous areas creates zones of weakness of the electrical field within the generator, which causes accelerated aging. An elegant manner of solving this type of problem would be to be able to cut these curvature areas after preparing the assembly so as to produce a multi-layer assembly which is totally homogeneous along its entire surface. However, as mentioned above, the processes which are available cannot produce the desired results without serious disadvantages.

It is therefore an object of the invention to solve the type of problems mentioned above in an elegant manner, while optimizing the designs and performances of electrochemical generators.

It is another object of the present invention to provide a process enabling to cut out curvature areas of a flat roll, after assembly thereof, so as to produce a multi-layer assembly which is totally homogeneous along its entire surface.

It is also an object of the invention to provide batteries of smaller dimensions by cutting a multi-layer battery of a larger dimension, wherein the operation is a sharp cutting which utilizes localized abrasive mechanical means, such as water jet cutting containing an abrasive agent, or oil cutting containing an abrasive agent, or cutting with a diamond-containing wire, and without exercising pressure on the metallic collectors nor producing sufficient mechanical deformations to generate short circuits or weak points.

Another object of the invention resides in the demonstration that mechanical cutting operations such as but not limited to shear cutting, crush cutting or punching are possible under certain conditions and that it is possible to produce generators which are more compact and more performing during cycling through adequate control of the mechanical strengthening of the multi-layer battery and of the cutting conditions.

Another object of the invention is to provide for a step of mechanical strengthening of the multi-layer assembly which makes the films unitary with one another and the assembly relatively impervious, and which permits the use of a reactive liquid such as water.

Another object of the invention resides in the provision of a process of cutting using a water jet, which technology, up to now, was considered to be totally incompatible with a device consisting of thin films additionally including a lithium anode.

Another object of the invention resides in the provision of multi-layer designs of generators which are particularly advantageous as compared to the prior art, with respect to their performances as well as their ease of manufacturing.

SUMMARY OF INVENTION

The invention concerns a process for preparing an all-solid lithium or sodium electrochemical generator, comprising the following steps:

(a) preparing a stack of battery laminate, each comprising anode, polymer electrolyte, cathode, and collector films, and optionally an insulating film, and (b) cutting the assembly obtained in (a) in predetermined shapes by utilizing mechanical means, wherein the stack of battery laminate is prepared under conditions adapted to constitute a rigid substantially impervious monoblock assembly, in which the films are all adherent to each other, and the mechanical cutting is carried out without macroscopic deformation of the films constituting the assembly and without inducing permanent short circuits or weak points.

In the present specification and in the appended claims, the term "macroscopic deformation" means a deformation which is visible to the naked eye. In other words, if some minute deformation takes place which is not visible to the naked eye, according to the invention, this means that there is no macroscopic deformation of the film.

According to a preferred embodiment, the cutting operation may be carried out by means of a jet of a reactive or non-reactive fluid, and, if needed, the jet may include a solid abrasive material which is dispersed within the fluid. Examples of abrasive materials include, without limitation, silica sand, diamond powder, an abrasive of type Grit 80™ of Barton Garnet, and others well known to those skilled in the art.

According to a preferred embodiment, the cutting operation is carried out by means of a movable abrasive wire which is capable of producing a cut without macroscopic deformation and short circuits. This abrasive wire may be a diamond-containing wire, and the wire itself is normally made of steel.

According to a preferred embodiment, the cutting operation may be carried out by mechanical means without macroscopic deformation within the multi-layer battery assembly. Examples of mechanical means include but are not limited to crush cutting, shear cutting and punching. Blades or dies used could be metallic or ceramic.

According to a preferred embodiment, the anode constituting each of the batteries is made of lithium or is a lithium-based compound or alloy, and should be capable of self-oxidation so as to constitute an electrically-insulating layer. Alternately, it should be capable of becoming chemically dissolved in the presence of the cathode following an accidental short circuit which may result from the cutting operation.

The stack of battery laminate, may be treated, according to the invention, to make the rigid monoblock assembly sufficiently impervious to prevent fluid penetration between layers of the monoblock assembly. This makes it possible according to the invention, during the cutting operation, to introduce a reactive fluid, such as water, alcohol, halogenated compounds, or sulfur or oxygen containing compounds, which are capable of oxidizing lithium and possibly of dissolving part of the lithium so as to prevent any electrical short circuits between the ends of the films of the anodes and of the conductive films of the cathode.

According to another embodiment, there is first prepared a multi-layer generator consisting of the succession of the following films: . . . anode, electrolyte, cathode, collector, cathode, electrolyte, anode . . . , and steps are taken so that these films all adhere to one another or are made adherent to one another, such as by an operation of hot pressing after assembly, or by utilizing a partially cross-linked electrolyte, or by utilizing cross-linkable or non-cross-linkable adhesion additives. In the same manner, a stack of batteries could also be prepared so as to obtain a multi-layer generator consisting of the succession of the following films: . . . anode, electrolyte, cathode, collector, insulating film, anode . . . A multi-layer generator could also be prepared consisting of the succession of the following films: . . . collector, anode, electrolyte, cathode, collector . . .

According to another embodiment, there is provided an elementary battery comprising films of anode, polymer electrolyte, cathode, collector and possibly a film of insulating material, the laminate of the elementary battery is rolled flat while laterally leaving an excess of anode and cathode collectors, and at least the areas of curvature are cut at the ends of the flat roll, according to step (b).

According to another embodiment, a longitudinal cut is made at the center of a symmetrical assembly so as to reduce losses due to the imprecision of the position of the films and the possible application of insulating bands to prevent possible lateral short circuits, such as described in U.S. Pat. No. 5,360,684 of Nov. 1, 1994 in the name of the Applicant.

According to another embodiment, part of the oxidized lithium is dissolved or mechanically removed so as to free the lateral ends of the sheets of the cathode.

According to another embodiment, a metal is pulverized on the face(s) where the collector is accessible, to provide for a lateral connection between the sheets of the collector of the cathode.

The invention also concerns an electrochemical generator comprising a monoblock multi-layer assembly in which the components comprise anode, polymer electrolyte, cathode, collector films and possibly insulating films, these films being laminated and unitary, adherent to one another and relatively impervious, the assembly including at least an end appearing as a uniform cut, the various films constituting the assembly having undergone no macroscopic deformation, the ends of the anode films possibly including an electrically insulating passivation film.

BRIEF DESCRIPTION OF THE DRAWINGS

Other characteristics and advantages of the present invention will appear from the description which follows of preferred embodiments, given by way of illustration and without limitation, in which:

FIG. 1 is a schematic view of a laminated mother battery intended for assembling a multi-layer battery;

FIG. 2 is a perspective view of a multi-layer flat roll obtained from the laminated mother battery illustrated in FIG. 1;

FIG. 3 is a perspective view showing cut areas of curvature at the ends of the flat multi-layer roll of FIG. 2 and the resulting prismatic assembly;

FIG. 4 is a perspective view of a flat roll showing cut areas of curvature and other transverse cuts;

FIG. 5 is a perspective view of a bipolar multi-layer stacking;

FIG. 6 is a perspective view of cuts of various shapes, obtained from the bipolar multi-layer stacking illustrated in FIG. 5;

FIG. 7 is a view similar to FIG. 3, showing longitudinal cuts;

BRIEF DESCRIPTION OF PREFERRED EMBODIMENTS

Figure 8:
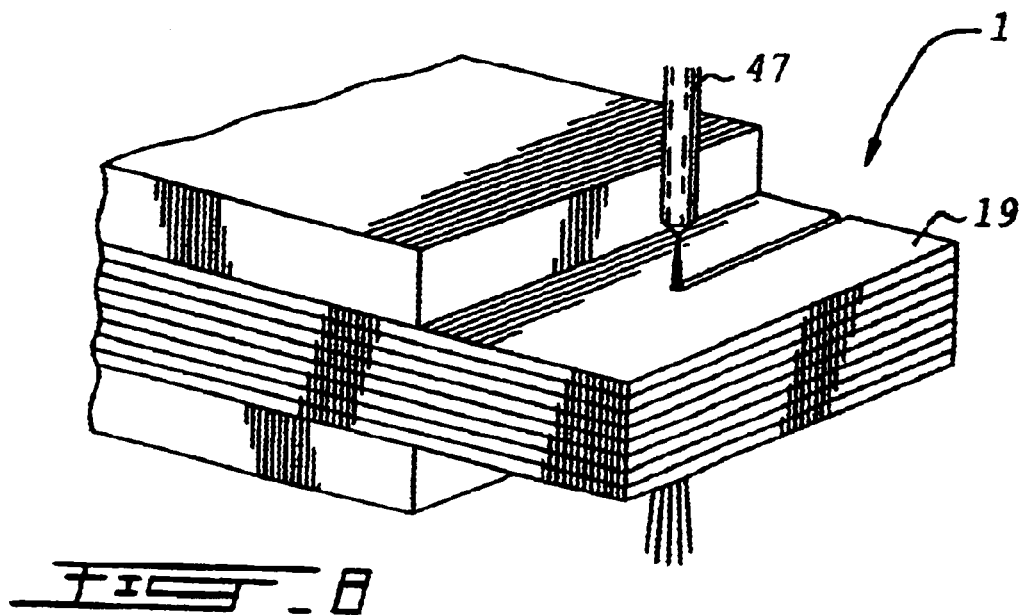
FIG. 8 is a schematic view in perspective illustrating the operation of cutting with a jet of water or oil.

With reference to the drawings, there is shown an advantageous way of producing a type of multi-layer generator according to the invention, from a laminated mother battery 1 (FIG. 1) consisting of the following layers: a sheet of lithium 3 constituting the anode, a first layer of polymer electrolyte 5 and a first layer of a cathode 7, as well as its collector 9; a second layer of cathode 11 and finally a second layer of electrolyte 13. Detailed information on film arrangement can be found in U.S. Pat. No. 5,360,684.

This procedure consists in rolling or stacking the elements in parallel while allowing the cathode collector and the lithium anode to protrude along a different lateral edge so as to facilitate collection of the entire surface of the electrodes by a lateral connection on the superposed sheets of the anode on the one side and of the cathode collector on the other side.

A particularly interesting design because it combines ease of manufacturing and volume compactness is a flat roll schematically illustrated in FIG. 2.

However, as mentioned above, this design presents disadvantages, for example, the presence of areas of curvature 15 and 17 where, locally, the surfaces and current densities are uneven and the pressure resulting from variations of volume cannot be compensated.

An embodiment of the invention is illustrated in FIGS. 3 and 4 by way of illustration but without any limitation. A generator assembled in parallel by rolling a laminated mother battery 1 as illustrated in FIG. 2 includes on its front and rear faces, areas where the collectors (not illustrated) of the cathode and of the anode, respectively protrude. The cutting operation which will be discussed later is localized at the two ends of the roll and enables to produce a prismatic assembly 19 (FIG. 3) including two current collection lateral edges of the cathode and the anode, or a plurality of prismatic assemblies 21, 23 and 25, by multiple cuttings (FIG. 4).

An embodiment of the invention is illustrated in FIGS. 5 and 6. First, there is prepared a multi-layer bipolar generator by successive stacking of the following films . . . collector, lithium, electrolyte, cathode, collector . . . as illustrated in FIG. 5. This generator includes collectors for current collection on its lower and upper faces respectively. The operation of cutting enables the production of cuts of multiple shapes 27, 29 and 31 (FIG. 6), the electrical contacts being provided at the lower and upper faces of the cut batteries.

Another embodiment of the invention is illustrated in FIG. 7. It will be noted that the longitudinal cuts enable the production of elements 33, 35, 37 and 39 in addition to the removal of the areas of curvature 41 and 43, by transverse cutting.

Figure 9:
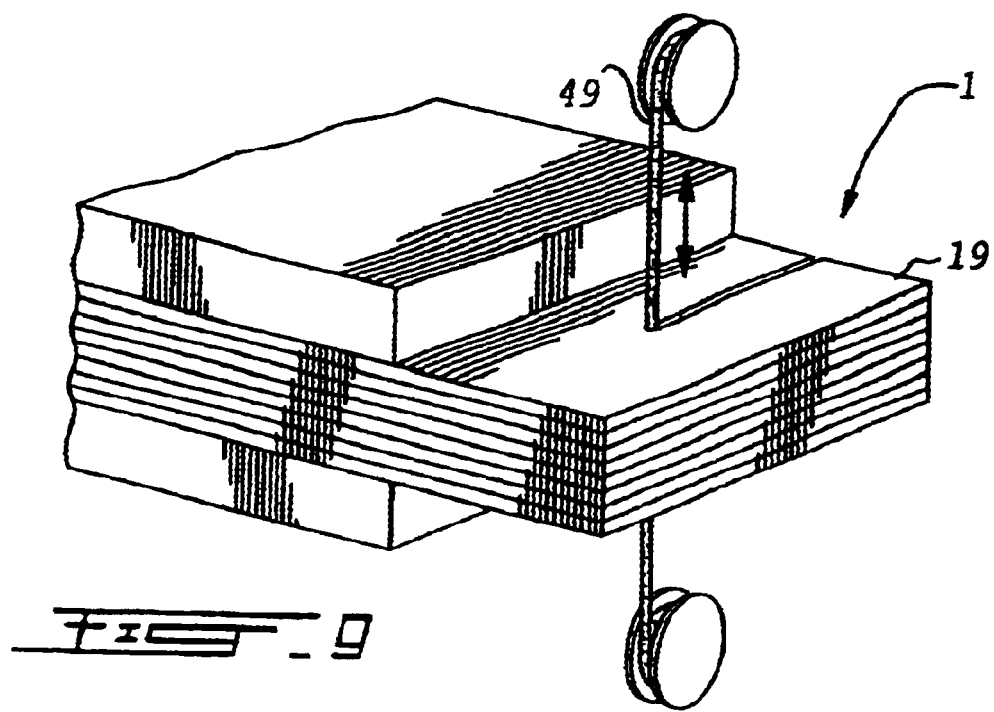
FIG. 9 is a schematic view in perspective illustrating the cutting of a multi-layer battery with an abrasive wire.
Figure 9A:
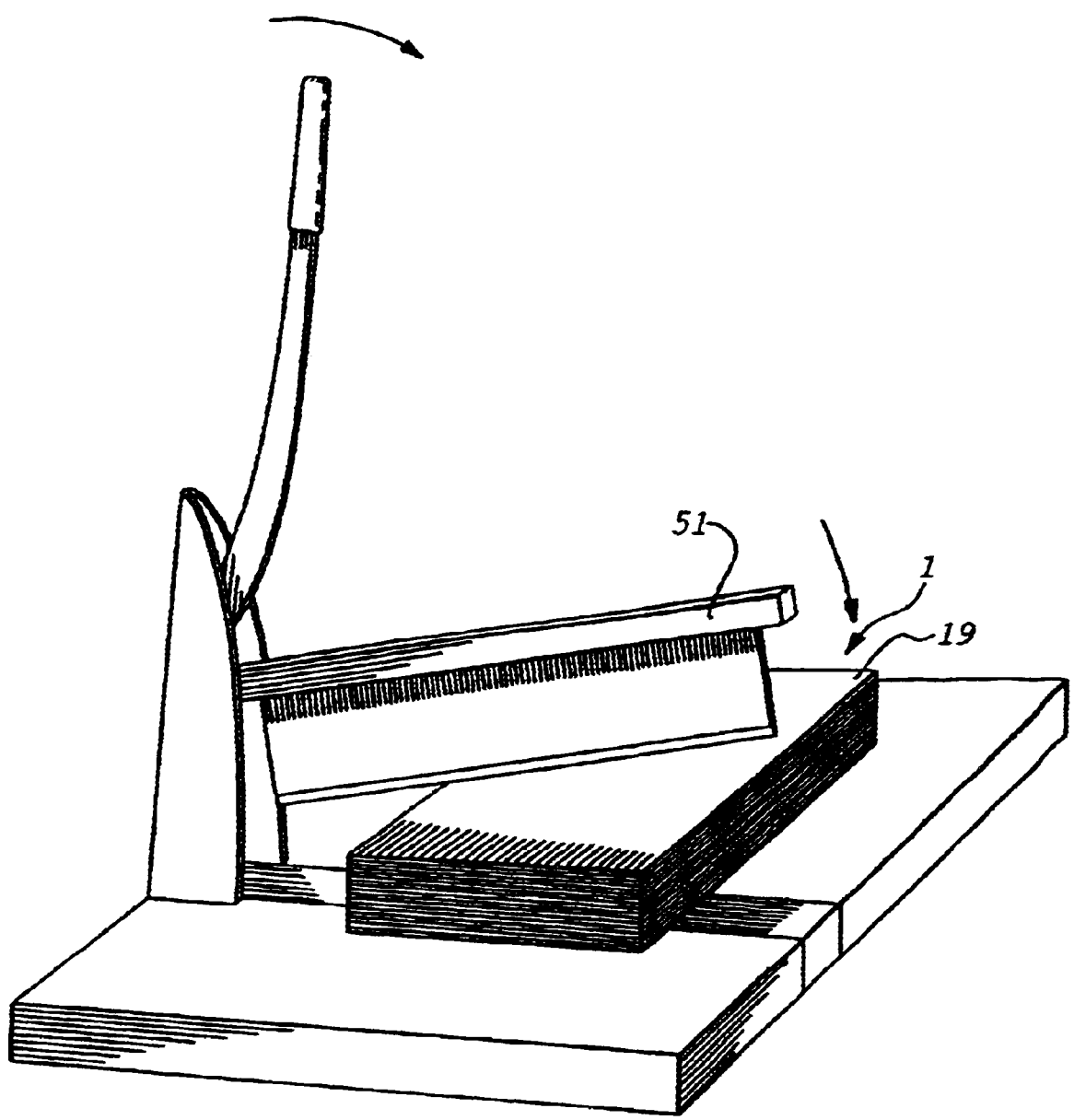
FIG. 9a is a schematic view in perspective illustrating the cutting of a multi-layer battery with a crush cutter.

A first means to effect the cutting operation of a laminate mother battery 1 according to the invention is schematically illustrated in FIG. 8. The liquid jet 47 of FIG. 8 is well known to those skilled in the art. In the illustrated case, this is an oil jet including a solid abrasive material, such as particles of Grit 80®, dispersed in the oil. Alternately, a water jet including a silica sand abrasive or a jet of any other reactive or non-reactive fluid, for example, alcohol, halogenated or oxygenated or sulfur-containing compounds, could also be used. A mechanical means schematically illustrated in FIG. 9 could also be used with or without a lubricating agent or a reactive fluid to cut a laminate mother battery 1. This device is a diamond-containing wire 49 which is again well known to those skilled in the art. Another means used for the cutting operation of a laminate mother battery 1 includes a crush cutter 51 such as illustrated in FIG. 9a. It will obviously be understood that any other means known to those skilled in the art constituting a localized abrasion and which can produce a cut or multiple simultaneous cuts, or other mechanical means which can cut or simultaneously multi-cut without macroscopic deformation of the multi-layer battery assembly may also be used without departing from the scope of the present invention.

With the impervious multi-layer of FIG. 8 that consists entirely of films which adhere to one another so as to form a mechanically strong dense block the cutting process of the invention is essential for preventing short-circuits or long cycle life. In this connection, it is understood that the adhesion of the films with one another may result from the nature of the various films used, or this result may be obtained by hot pressing the laminate after assembling the latter. Adhesion agents well known to those skilled in the art, such as cross-linkable or non cross-linkable thermal adhesive materials could also be used.

The presence of a lithium base anode is particularly advantageous for the operation of the invention, because lithium tends to chemically react with the cathode if an accidental short circuit is produced during the cutting operation or possibly by the cutting fluid. The fact that the freshly cut lithium is reactive may also be used to advantage in that the exposed lithium is easily oxidized and converted into an electrically insulating material such as $Li_2O$ or LiOH. This phenomenon, combined with the fact that the multi-layer assembly is converted into a mechanically dense block only superficially penetrated by a fluid phase, allows the unexpected use of a reactive fluid such as water to cut the battery, without chemically polluting same.

Figure 10:
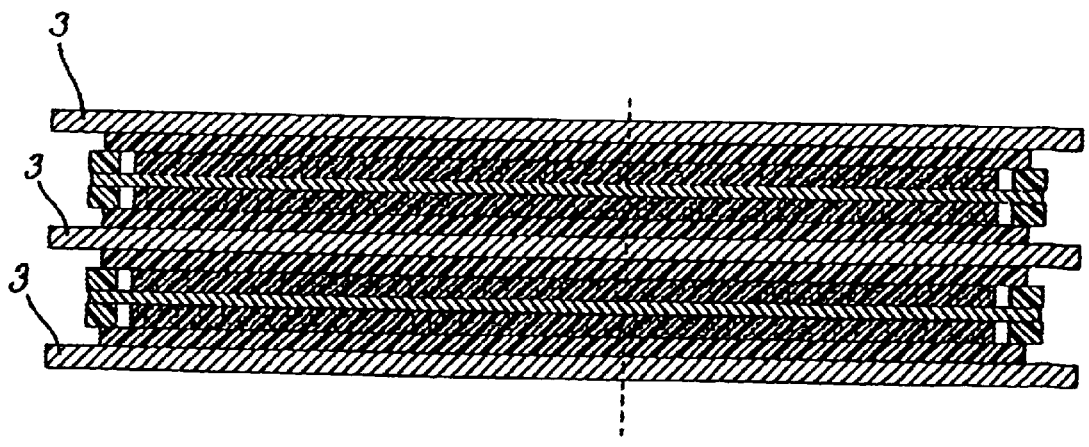
FIG. 10 is a cross-section view of a multi-layer battery of FIG. 7 before longitudinal cutting.
Figure 11:
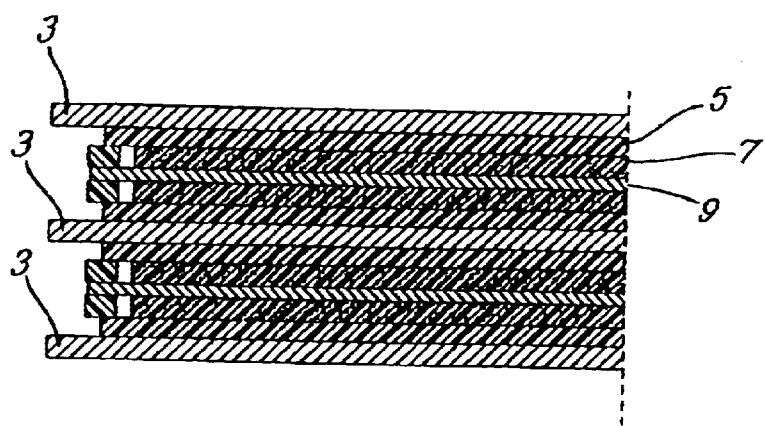
FIG. 11 is a cross-section view of a multi-layer battery of FIG. 10 after cutting at the center.
Figure 12:
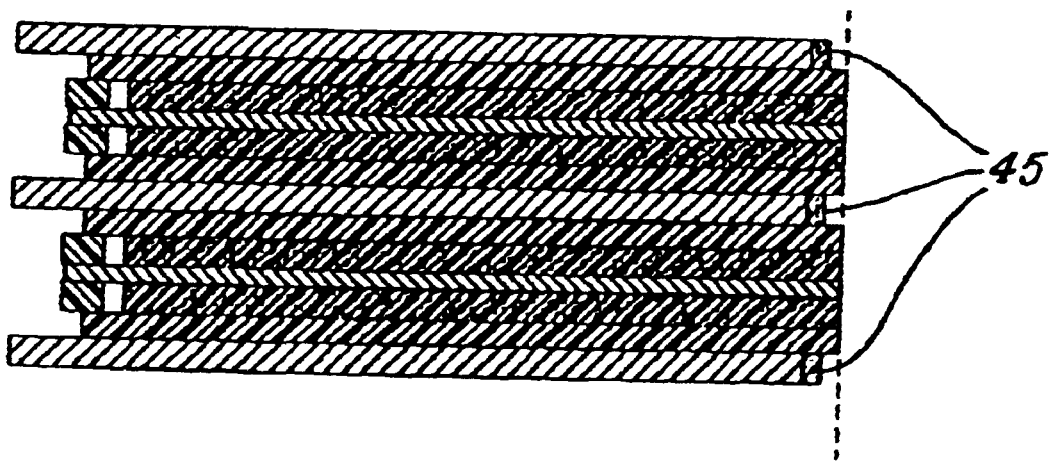
FIG. 12 is a view similar to FIG. 11 after oxidation of lithium.
Figure 13:
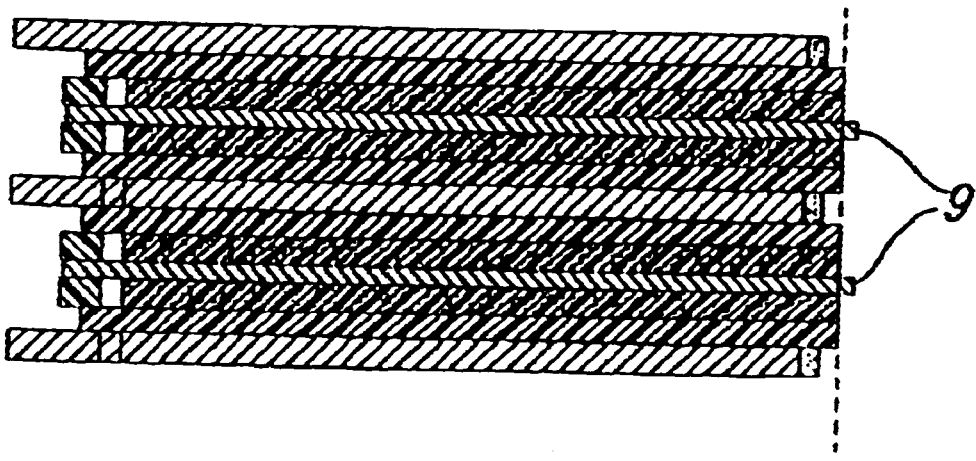
FIG. 13 is a view similar to FIG. 12 showing the exposed current collector for providing a connection.

FIGS. 10, 11, 12 and 13 illustrate how the cutting process and the simultaneous or ulterior oxidation reaction of the exposed lithium can be used to realize designs wherein the collection zone of the extremities of the sheets of the cathode collector may extend on more than one edge so as to optimize thermal and electrical exchanges. FIG. 10 is a cross-section view of the multi-layer battery of FIG. 7 before longitudinal cutting. FIG. 11 is a cross-section view of the multilayer battery of FIG. 10 after longitudinal cutting. FIG. 12 is a view similar to FIG. 11 except that it is taken after oxidation of lithium at 45. FIG. 13 is a view similar to FIG. 12 except that it is taken after freeing the current collectors 9 by removing the surrounding soft materials.

An advantage resulting from the process of the invention is to enable to reduce to a minimum the inactive areas from an electrochemical point of view, for example, by removal of the areas of curvature of the roll: less compact on a volume scale. Similarly, there is a reduction of the importance of the lateral protruding zones at the ends of the sheets of the anode and the cathode which is penalizing on a volumic point of view, taking into account the need to incorporate an insulation band and the margin of error which results from the approximate positioning of the films with respect to one another. Reference will be made particularly to U.S. Pat. No. 5,360,684 assigned to the Applicant.

It goes without saying that the ways of producing multi-layer assemblies are not limited to those disclosed. Various processes or sequences of materials may lead to the cutting process according to the invention, including by way of example, series or parallel assemblies.

Other cutting means which use mechanical abrasion with or without chemical additives are of course possible as well as an infinity of organic or mineral fluids, for example, liquid nitrogen, liquid argon, alcohol, halogenated, sulfur containing or oxygenated compounds. In certain cases these may also be used during or after the cutting operation to dissolve and/or oxidize part of the lithium exposed and in some cases part of the cathode collector so as to electrically insulate the ends of the sheets of the anode from the other components of the sheets of the cathode.

It goes without saying that those skilled in the art will benefit from the characteristics of the invention for cutting multi-layer generators of various shapes, including, if needed, holes inside the assemblies, or shapes suitable for various applications.

The invention will now be illustrated by the examples which follow, obviously given without limitation. Polymer and electrode compositions used for the following examples have been described in several previous patents such as U.S. Pat. No. 4,578,326.

EXAMPLE 1

Starting from a thin laminate as illustrated in FIG. 1, one biface battery measuring 135 mm×150 mm with a thickness of 5 mm is assembled by flat rolling. The thin laminate consists of a film of a lithium anode 54 $\mu$m thick, two films of cathode 40 $\mu$m thick, two films of polymer electrolyte 15 $\mu$m thick, and one central aluminum collector 15 $\mu$m thick. The laminate has lateral protrusions enabling parallel contact of the successive multi-layers. The cathodes are based on vanadium oxide and a polymer electrolyte. The battery is thereafter removed from its rolling mandrel and is pressed in a machine under vacuum at 80° C. to permit a homogeneous adhesion of the electrolytes to the materials of the anode and of the cathode. The battery is thereafter cut transversely by means of a water jet so as to remove the areas of curvature and to preserve the possibility of providing contact through the lateral protrusions (FIG. 3).

Water under pressure of 40,000 psi contained an abrasion additive of the type silica sand. Cutting speed was 10 cm/min. The water jet formed an angle of 90 degrees with respect to the surface of the battery (FIG. 8). During the cutting operation, temporary short circuits caused by the presence of water are noted. A decrease in the voltage of the battery of about 50 mV is measured. The battery is thereafter wrapped and cycled to evaluate its electrochemical performances.

Figure 14:
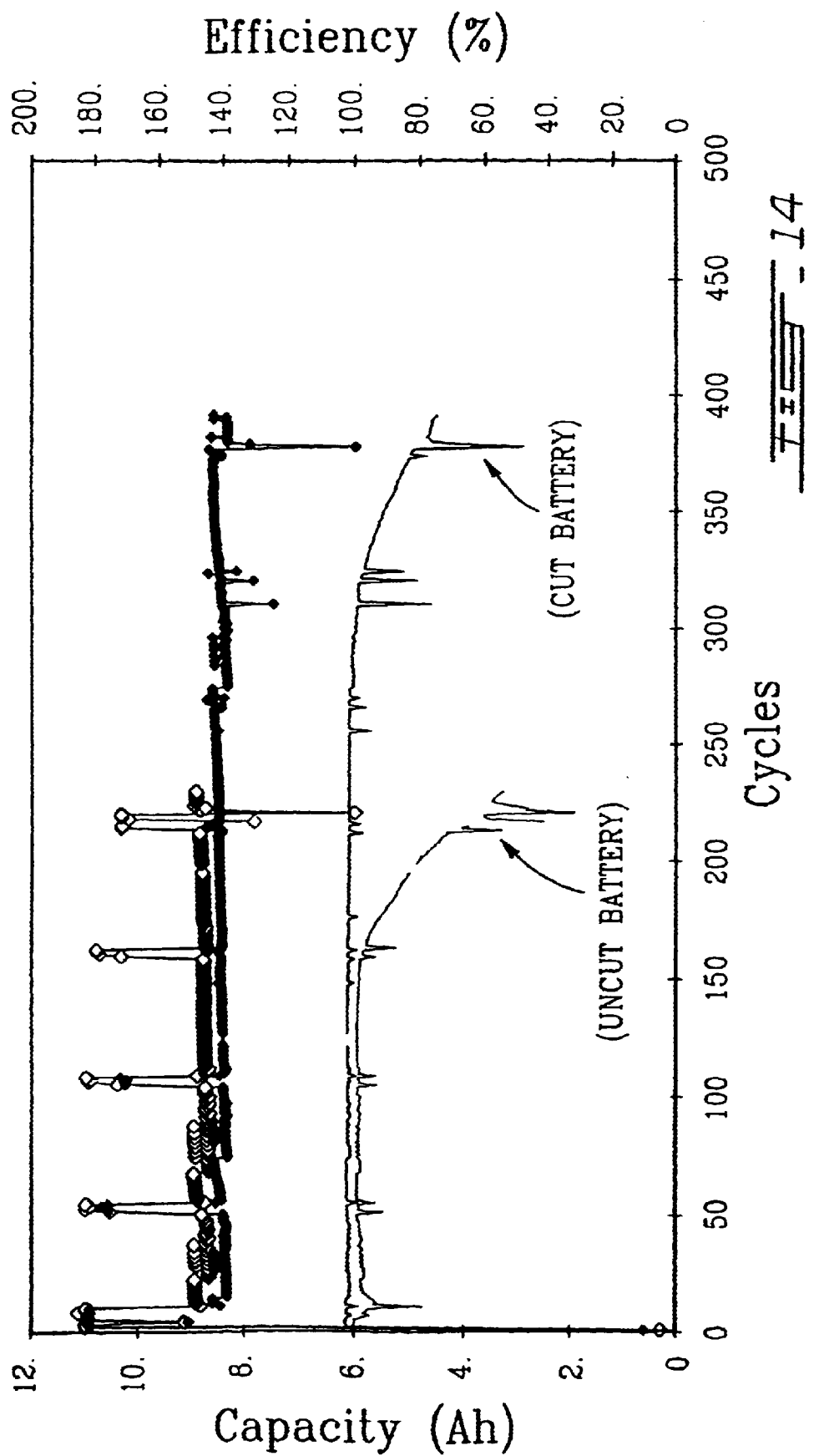
FIG. 14 compares curves of charge/discharge of a multi-layer battery according to the invention after cutting with a jet of water containing an abrasive, with those of a battery which is equivalent but has not been cut.

The battery of 11 amp-hour (Ah) is discharged within three hours at 80% depth of discharge according to a DST type (dynamic stress testing developed by United States Advanced Batteries Consortium to simulate electrical vehicle application) and thereafter recharged during 10 hours up to 3V. The electrochemical results obtained from this battery which has been cut with a water jet were compared to those obtained with similar batteries which were not cut. The cut battery reached over 400 cycles of charge and discharge, while the equivalent uncut battery reached only 230 cycle of charge and discharge under the same cycling conditions (FIG. 14).

EXAMPLE 2

Starting from a thin laminate as illustrated in FIG. 1, a biface battery measuring 135 mm×150 mm and a thickness of 5.5 mm was assembled by flat rolling. The thin laminate consists of a film of a lithium anode 54 $\mu$m thick, two films of cathode 45 $\mu$m thick, two films of polymer electrolyte 25 $\mu$m thick, and a central aluminum collector 15 $\mu$m thick. The laminate has lateral protrusions enabling parallel contact of the successive multi-layers. The cathodes were based on vanadium oxide and a polymer electrolyte. The battery is thereafter removed from its rolling mandrel and pressed as in Example 1.

Figure 15:
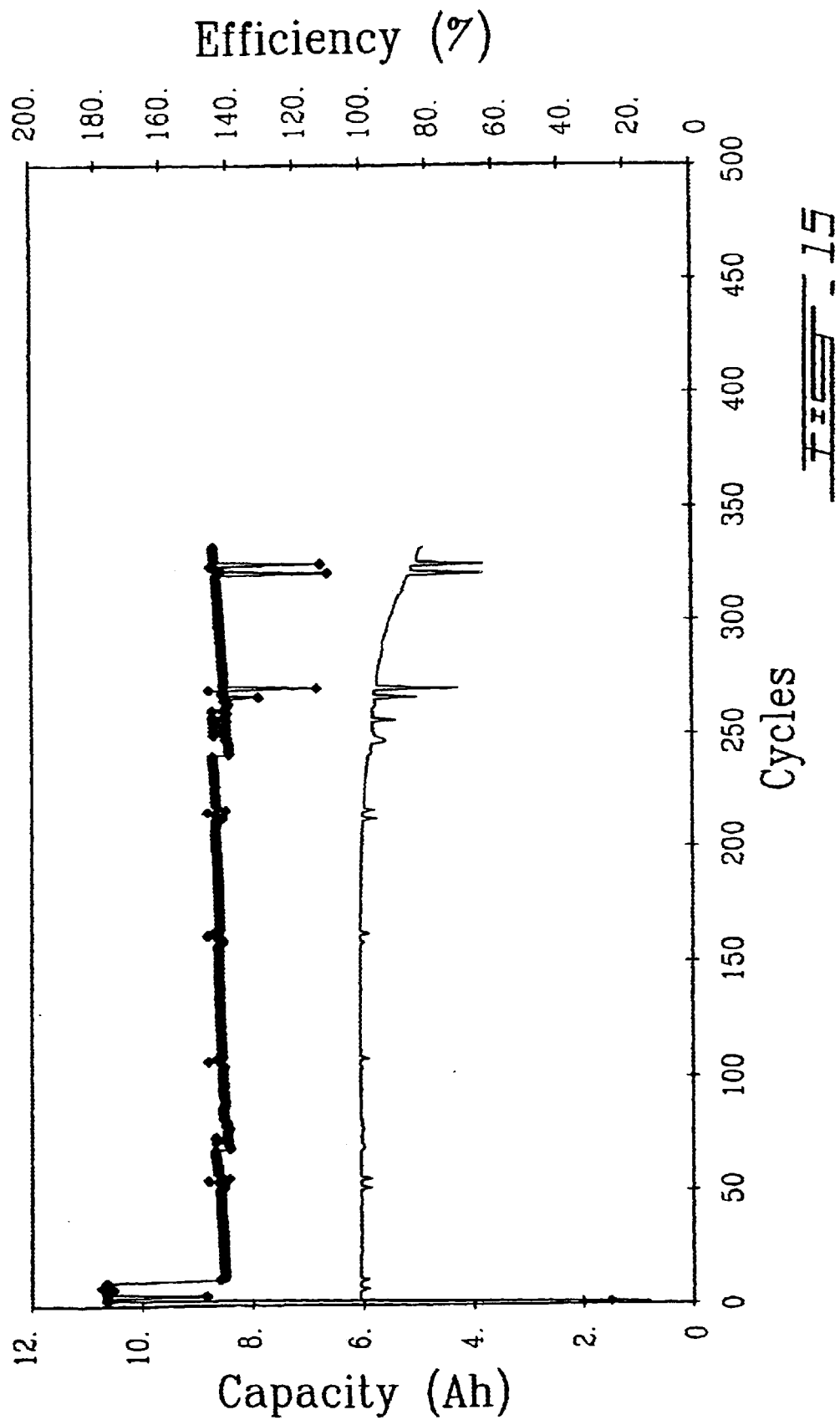
FIG. 15 is a charge/discharge curve of a multi-layer battery according to the invention after cutting with a diamond-containing wire without lubricating agents.

The battery is thereafter cut transversely by means of a diamond-containing wire without a lubricating agent (FIG. 9) so as to eliminate the areas of curvature and to preserve the possibility of effecting electrical contacts through the lateral protrusions (FIG. 3). The cutting speed used was 0.5 cm/min. During the cutting operation, no short circuit was noted. The battery of 1.5 mAh/cm$^2$ is discharged according to the same DST profile as in Example 1. The cycling curves indicate an excess of 330 cycles of charge/discharge (FIG. 15).

EXAMPLE 3

Figure 16:
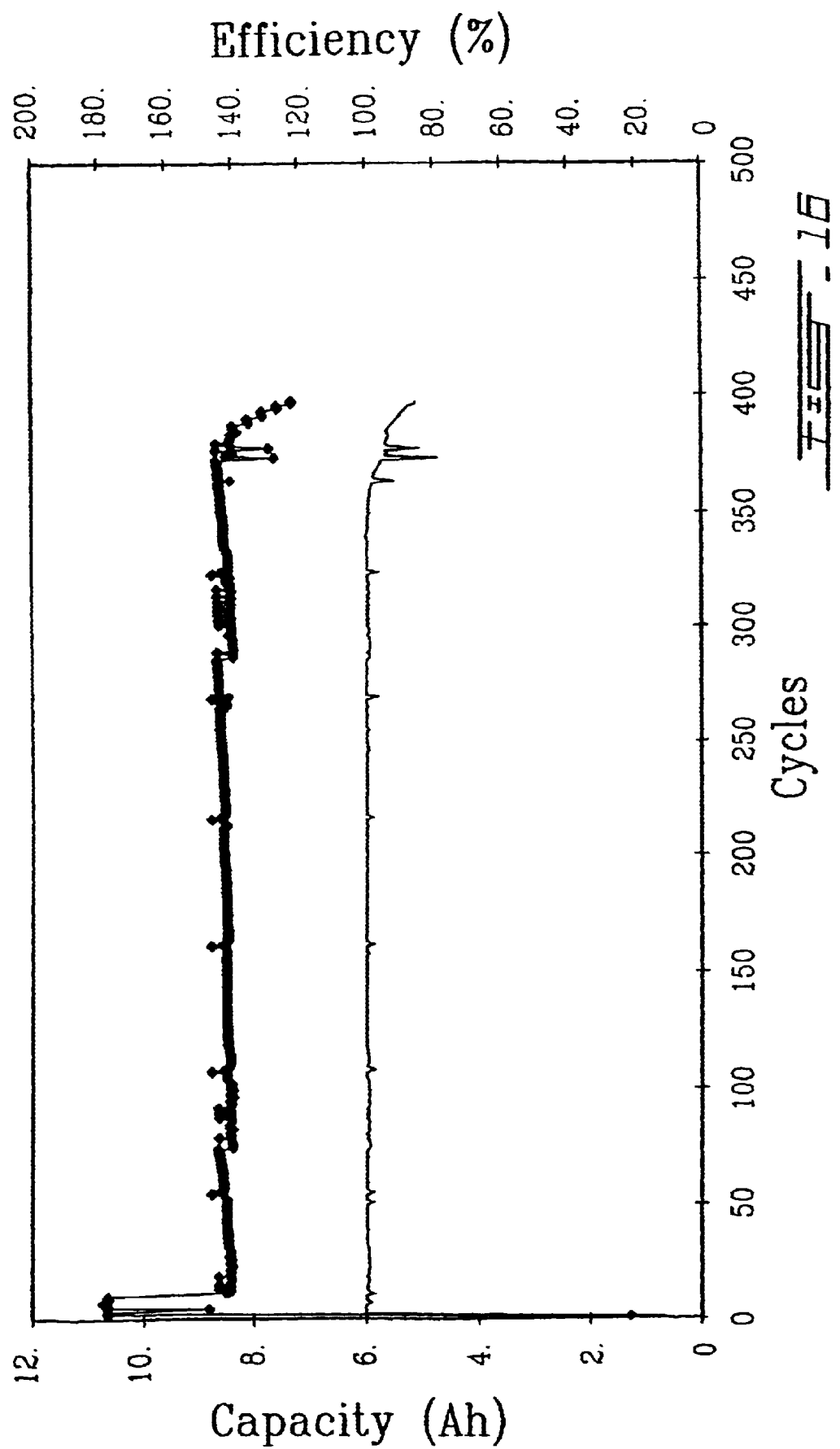
FIG. 16 is a charge/discharge curve of a multi-layer battery according to the invention after cutting with a diamond-containing wire including a lubricating agent.

The same type of battery as in Example 2 was assembled. The battery is thereafter cut transversely with a diamond-containing wire in the presence of a mineral oil base lubricant so as to remove the areas of curvature and to maintain the possibility of providing electrical contacts through the lateral protrusions. The battery is discharged according to the same DST profile as in the previous examples. The cycling curves are very similar to those obtained by cutting with a diamond-containing wire without a lubricating agent and show more than 400 cycles of charge/discharge (FIG. 16).

EXAMPLE 4

A battery similar to the one illustrated in Example 1 was subjected to a cutting operation. The battery is thereafter cut transversely with a jet of oil so as to remove the areas of curvature and to maintain the possibility of providing electrical contacts through the lateral protrusions.

The oil pressure used was 45,000 psi and is of the type NF of Bristol White. The oil contained an abrasion additive of the type Grit 80 of Barton Garnet. The cutting speed used was 21 cm/min. During the cutting operation, no short circuit was noted. The electrochemical results obtained from the battery cut with a jet of oil are similar to those already obtained in the previous examples.

EXAMPLE 5

Figure 17:
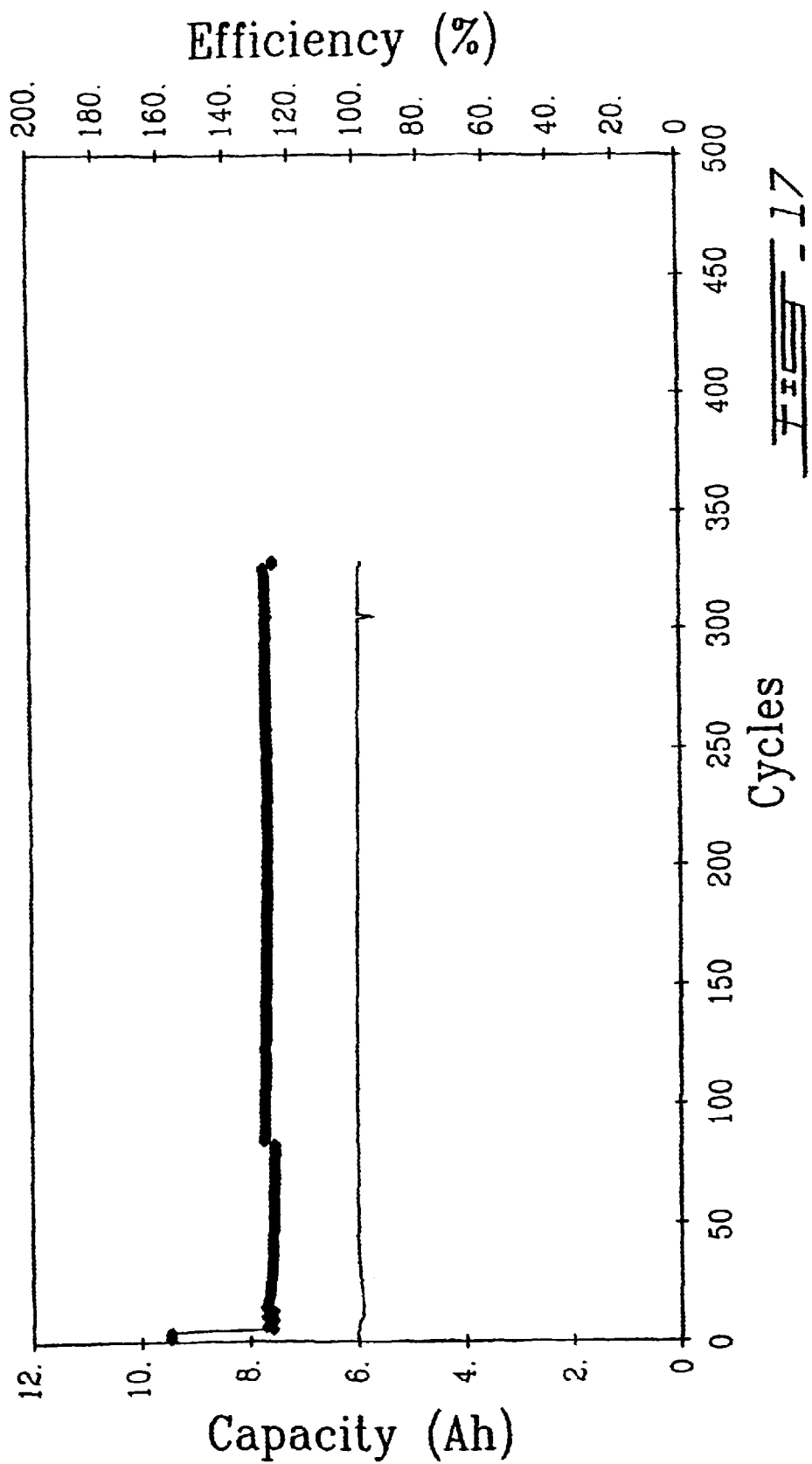
FIG. 17 is a charge/discharge curve of a multi-layer battery according to the invention after cutting with a crush cutter.

A battery similar to the one illustrated in Example 2 was subjected to a crush cutting operation so as to remove the areas of curvature and to maintain the possibility of providing electrical contacts through the lateral protrusions. A rubber cutter model 600 from Superior Manufacturing Corporation with a single bevel steel blade was used. Cutting operation took place within one second which is fast enough to avoid permanent short circuits or macroscopic deformations due to local pressure. In this test, the cut was followed by a local application of methanol to heal any possible residual weak points in the cut areas. The cycling curves indicate an excess of 300 cycles of charge/discharge (FIG. 17)

It is understood that modifications are possible without departing form the spirit of the present invention as will appear obvious to those skilled in the art.

We claim:

1. A process for preparing solid lithium electrochemical generators comprising the steps of:
   (a) preparing a battery laminate comprising a lithium anode film, a polymer electrolyte film, a cathode film and a current collector film;
   (b) cutting said battery laminate with a mechanical cutting means comprising means selected from the group consisting of solids, liquids, and mixtures thereof, thereby exposing a cut edge of said battery laminate; and
   (c) applying a reactive fluid selected from the group consisting of water, alcohol, halogenated compounds, sulfured compounds and oxygenated compounds onto said cut edge to electrically insulate an exposed edge of said lithium anode film from an exposed edge of said cathode film so as to prevent electrical short circuits between said anode film and said cathode film.

2. A process as defined in claim 1 wherein said reactive fluid oxidizes said exposed edge of said lithium anode film and forms a passivation film along said exposed edge of said anode film.

3. A process as defined in claim 1 wherein said reactive fluid is applied onto said cut edge during the step of cutting said battery laminate.

4. A process as defined in claim 1 wherein said reactive fluid is applied onto said cut edge following the step of cutting said battery laminate.

5. A process as defined in claim 2 wherein lithium from said exposed edge of said lithium anode film is oxidized by said reactive fluid and converted into an electrically insulating material such as $Li_2O$ or LiOH.

6. A process as defined in claim 5 wherein said lithium anode film is made of lithium metal, lithium alloy or lithium based compound.

7. A process as defined in claim 1 wherein said reactive fluid is methanol.

8. A process as defined in claim 1 wherein said battery laminate is a biface laminate comprising an anode film, an electrolyte film, a cathode film, a current collector, a second cathode film, a second electrolyte film and a second anode film.

9. A process as defined in claim 1 wherein prior to cutting said battery laminate, a pressing operation is carried out to make said films adherent to each other.

10. A process as defined in claim 1 wherein said mechanical cutting means comprises a blade or a die.

11. A process as defined in claim 1 wherein said mechanical cutting means cuts using a technique selected from the group consisting of crush cutting, shear cutting, or punching.

12. A process as defined in claim 1 wherein said mechanical cutting means comprises a jet of reactive or non-reactive fluid.

13. A process as defined in claim 12 wherein said jet of reactive or non-reactive fluid comprises a solid abrasive material.

14. A process as defined in claim 1 wherein said mechanical cutting means comprises an abrasive wire.

15. A process as defined in claim 1 wherein said reactive fluid comprises water.

* * * * *